United States Patent
Ruffa

(10) Patent No.: US 7,495,611 B2
(45) Date of Patent: Feb. 24, 2009

(54) METHOD FOR DETERMINING SIGNAL DIRECTION USING ARTIFICIAL DOPPLER SHIFTS

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/772,853

(22) Filed: Jul. 3, 2007

(65) Prior Publication Data

US 2009/0009382 A1    Jan. 8, 2009

(51) Int. Cl.
    *G01S 5/02* (2006.01)
(52) U.S. Cl. .................. 342/428; 342/418; 342/443
(58) Field of Classification Search ............ 342/418, 342/428, 442–444
    See application file for complete search history.

(56) References Cited

U.S. PATENT DOCUMENTS

| 3,047,864 A | 7/1962 | Byatt |
| 3,054,105 A | 9/1962 | Steiner et al. |
| 3,490,023 A | 1/1970 | Weisbrich, Jr. |
| 3,774,212 A * | 11/1973 | Eckert et al. .................. 342/408 |
| 3,845,487 A | 10/1974 | Lammers |
| 3,883,857 A | 5/1975 | Magnusson |
| 4,518,967 A | 5/1985 | Westerman |
| 6,628,231 B2 * | 9/2003 | Mayersak ............... 342/357.05 |
| 6,646,601 B2 | 11/2003 | Samson et al. |
| 2007/0273582 A1 * | 11/2007 | Klinghult et al. ........ 342/357.06 |

* cited by examiner

*Primary Examiner*—Dao L Phan
(74) *Attorney, Agent, or Firm*—James M. Kasischke; Jean-Paul A. Nasser; Michael P. Stanley

(57) ABSTRACT

A method for determining the direction of an incoming signal is provided in which each of a plurality of receivers arranged in a linear array is sampled in sequence to simulate a single receiver moving along an aperture defined by the linear array at a simulated speed. This generates a simulated time series data from which a simulated Doppler shift in the incident angle is measured. The simulated Doppler shift is used to determine the incident angle between the incident signal and the linear array of receivers. By adjusting the simulated speed to eliminate artifacts in the power spectral density of the data obtained from the receivers, the incident angle can be obtain from the expression of the simulated Doppler shift.

15 Claims, 4 Drawing Sheets

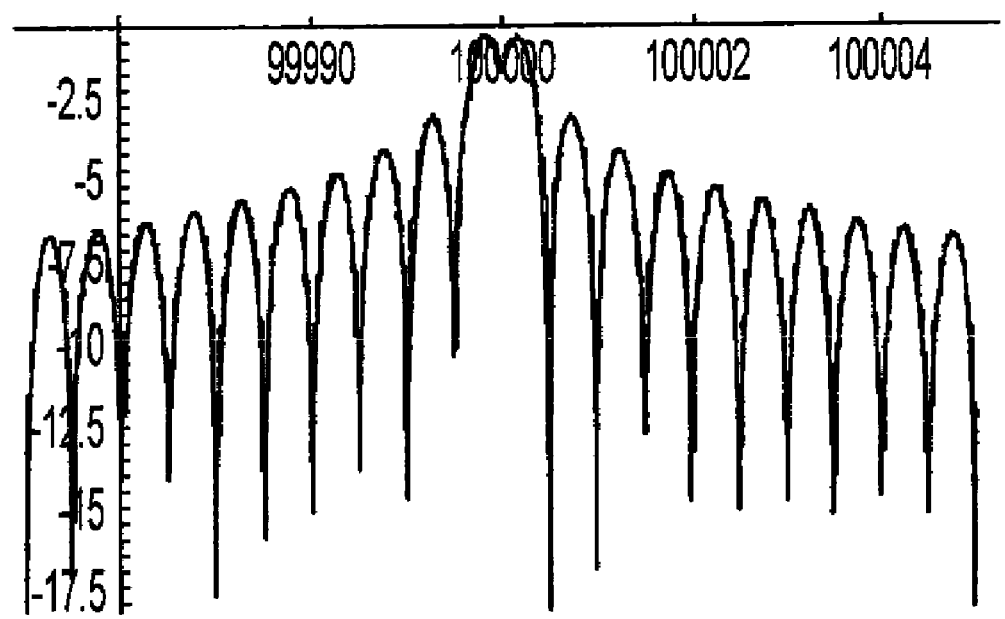
Power spectral density
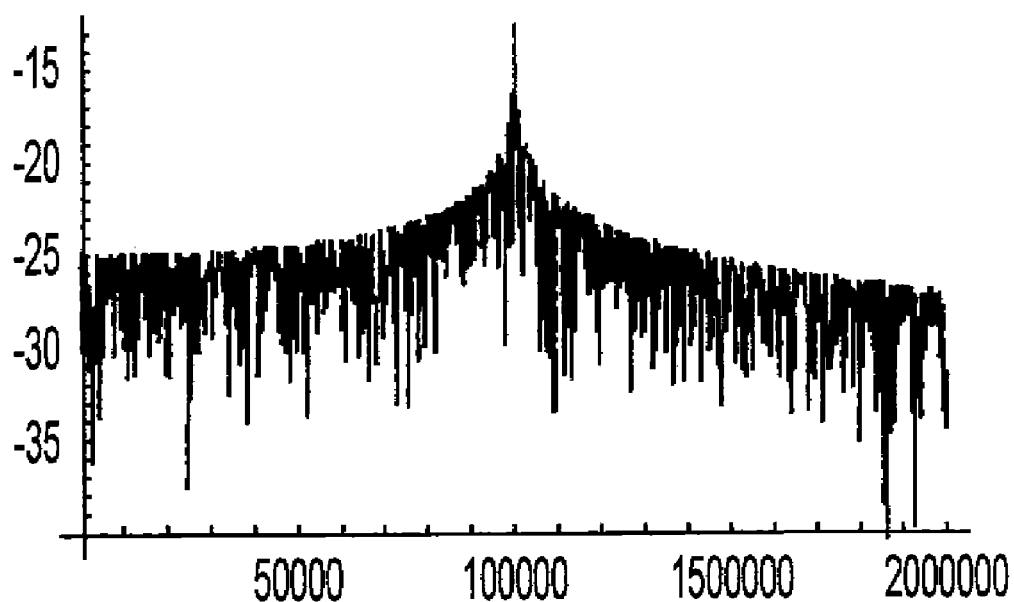
Fig. 2

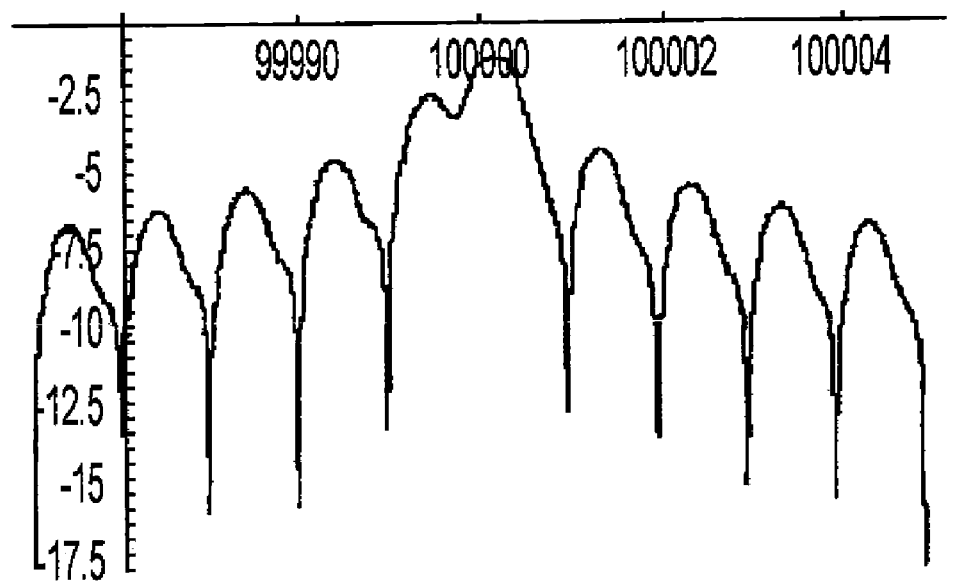
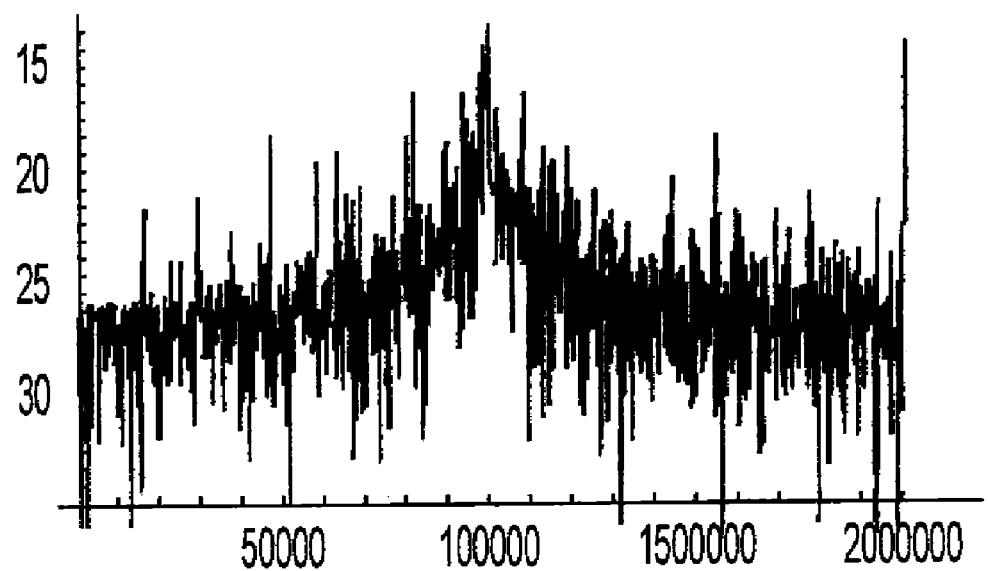
Fig. 3

Time series when the receiver speed is perfectly tuned, containing exactly 99 periods Time series when the receiver speed is imperfectly tuned, leading to a differencec in voltage between t=0 and t=T

METHOD FOR DETERMINING SIGNAL DIRECTION USING ARTIFICIAL DOPPLER SHIFTS

STATEMENT OF GOVERNMENT INTEREST

The invention described herein may be manufactured and used by or for the Government of the United States of America for governmental purposes without the payment of any royalty thereon or therefore.

BACKGROUND OF THE INVENTION

1. Field of the Invention

The present invention is directed to improved localization of targets in the endfire beam generated by a line array of receivers. This is done with artificial Doppler shifts created by electronically moving a single receiver along the aperture.

2. Description of the Prior Art

Direction finding devices are used to determine the direction of propagating signals and hence the location of the source of these signals. These devices are utilized in spectrum monitoring, reconnaissance and surveillance. Direction finders utilize arrangements or arrays of receivers to detect arriving signals and to determine the direction from which these signals originated. For example, appropriate time delays applied to the receivers serves to steer the array and to calculate the direction of arrival of the impinging signals. Therefore, the data gathered from the receivers are used in conjunction with data processing algorithms to interpret the data and determine signal propagation direction relative to the receivers.

Some applications utilize the properties of Doppler effects to analyze the data obtained from the receivers. The Doppler effect or Doppler shift expresses the apparent change in the frequency and wavelength of a wave perceived by an observer that is moving relative to the source of the wave. This relative motion can be caused by the movement of the source, the observer or both the source and the observer. For example, an observer or receiver having velocity $v_r$ relative to a source having velocity $v_s$ introduces a Doppler shift as follows:

$$f_d = f \frac{c + v_r}{c - v_s}. \quad (1)$$

The Doppler shift can be derived for a plane wave from a stationary source having a pressure field of the form $p(x,t) = P_0 e^{i(\omega t - kx)}$. (A stationary receiver at x=0 measures the field $p(x,0) = P_0 e^{i\omega t}$, while a receiver moving according to x=-vt, i.e., opposite to the propagation direction of the plane wave, measures the field $p(x,t) = P_0 e^{i(\omega t + \omega v/c)t} = P_0 e^{i\omega t(1+v/c)}$.

One direction detection device applications employing Doppler effects uses a rotating structure possibly containing multiple circular arrangements of receivers. The Doppler shift is affected by whether or not a given rotating antenna is moving toward or away from the propagation direction of the signal. U.S. Pat. No. 3,490,023 discloses systems where a Doppler shift between the signal and the receiver is induced by physically moving or rotating a detector. However, the amount of movement and hence the sensitivity of the device is limited by the physical limitations of moving the detector. U.S. Pat. No. 3,845,487 discloses a system where linear motion of a single receiver is simulated using a single detector. These systems, however, are limited in the types of signals that can be processed, the amount of Doppler shift that can be induced and the accuracy or resolution with which the direction of the signal can be detected.

SUMMARY OF THE INVENTION

The present invention is directed to a method for determining signal direction. The method includes sampling each of a plurality of receivers arranged in a linear array in sequence to simulate a single receiver moving along an aperture defined by the linear array at a simulated speed and to generate simulated time series data. The receivers include audio receivers, hydrophones, radar receivers, microwave receivers and combinations thereof.

This simulated speed is tuned in accordance with the wavelength of a signal incident upon the linear array. Tuning of the simulated speed includes an initial setting or tuning of the speed and subsequent adjustments to the speed in accordance with the incident angle of the incident signal. Therefore, an initial simulated speed is set based on a zero degree incident angle, i.e., the "endfire" direction aligned with the line array, and an integer multiple of wavelengths of the incident signal being within the aperture. Then the simulated speed is tuned to maintain an integer multiple of wavelengths of the incident signal within the aperture. In order to provide for tuning of the simulated speed, the power spectral densities in the simulated time series data are monitored for artifacts indicating discontinuities in time adjacent data points. These artifacts correspond to Gibbs effects. Having identified any artifacts, the simulated speed is adjusted until the artifacts disappear.

The simulated time series data obtained during sampling is used to measure the Doppler shift, and this measured Doppler is used to determine the incident angle between the incident signal and the linear array of receivers, i.e., the axis of the linear array of receivers. In one embodiment, the simulated time series data are band pass filtered, for example by band pass filtering the signal data at each one of the receivers. The Doppler shift is then measured on each individual frequency band. Therefore, an incident angle for each individual frequency band, and all of the incident angles are averaged to determine a net incident angle.

BRIEF DESCRIPTION OF THE DRAWINGS

FIG. 2 is a graph illustrating an embodiment of a power spectral density;

FIG. 3 is a graph illustrating another embodiment of a power spectral density;

DETAILED DESCRIPTION OF THE INVENTION

Figure 1:
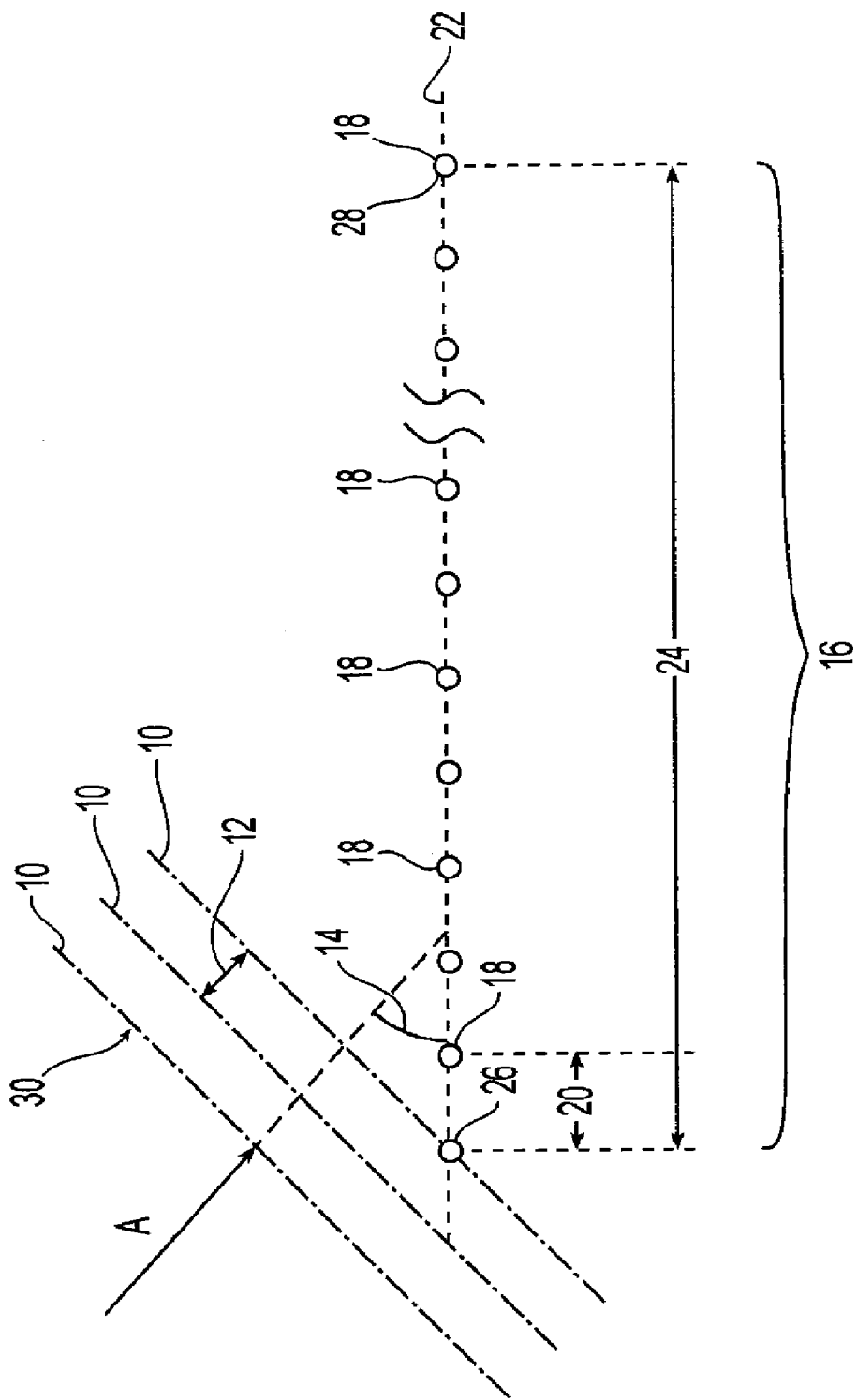
FIG. 1 is a schematic representation of an embodiment of a linear array of receivers and incident signal in accordance with the present invention.

Referring to FIG. 1, a plurality of receivers 18 are arranged in a linear array 16. Each receiver is spaced from the next receiver by a given distance 20. Any number of receivers can be included in the array. The receivers 18 are selected to be able to detect the desired type of incident signal 30. This incident signal 30 is a wave form signal having a plurality of waves 10 defining a given wavelength 12. The incident signal propagates in the direction of arrow A, defining a first receiver 26 in the array of receivers to detect the incident signal and a last or final receiver 28 in the array of receivers to detect the incident signal. In general, therefore, the incident signal travels along the array of receivers. The receivers are selected based upon the type of incident signal that is being detected and the medium in which that signal is propagating. Suitable receivers include, but are not limited to, audio receivers, hydrophones, radar receivers, microwave receivers and combinations thereof.

An incoming wave 10 of the incident signal 30 strikes the array of receivers 16 at an incident angle $\theta_i$ 14 defined between the direction of propagation of the wave, arrow A, and the axis 22 of the line array. As illustrated, the incident signal is approximated as a plane wave. This incident angle can vary between 0° and 90°, where $\theta_i=0$ corresponds to the endfire direction and $\theta_i=90$ corresponds to the broadside direction. By determining the incident angle, the source of the incident signal can be identified. The greater the degree of accuracy in determining the incident angle, the greater the degree of accuracy in locating a source of the incident signal.

The incident signal 30 has an apparent propagation speed through the linear array based upon the speed of that signal in the given medium and the incident angle of the signal to the linear array. This apparent speed is expressed by the equation $c_i=c_0/\cos\theta_i$.

In accordance with exemplary embodiments of methods for determining the incident angle of the incident signal, the linear array of receivers is used to produce an artificial Doppler effect by simulating a single receiver moving along a line or aperture defined by the axis of the linear array of receivers. This simulation is conducted at a predetermined simulated speed. In one embodiment, each one of the plurality of receivers arranged in the linear array is sampled in sequence, from the first receiver 26 to the last receiver 28, to simulate the motion of the single receiver moving along the line. The sequential sampling of the receivers generates simulated time series data as data measured in successive time steps are obtained from successive receivers in the line array. Sequential sampling of the stationary receivers in the line array generates a time series of sampled data points that simulate the data that would be received by the single receiver moving along the aperture defined by the linear array at the simulated speed.

For a simulated receiver speed V along the aperture, the virtual receiver transits across the entire aperture having length, L 24, in a time T=L/V. The receiver moves from one element or receiver in the array to the next in a time step of duration $\Delta t=L/(NV)=T/N$, where N is the number of receivers in the array. The artificial time series $y_a(t)$ generated from the N receivers is:

$$y_a(t_n) = \sum_{n=1}^{N} y_n(t_n), \text{ where } t_n = \frac{(n-1)T}{N}. \quad (2)$$

The simulated speed V can be set at any desired speed including speeds that are faster than the speed of sound (in the case of audio receivers or hydrophones), since the simulated receiver is not physically moving.

The simulated time series is used to measure the Doppler shift in the incident signal due to the motion of the simulated moving receiver. The measured Doppler shift is then used to determine the incident angle between the incident signal and the linear array of receivers. In one embodiment, the simulated or artificial Doppler shift facilitates the use of the apparent propagation speed of the receiver to distinguish the incident or arrival angles of incident signals arriving in a generally endfire beam that deviate from the endfire beam by only a few degrees and can even distinguish between incident signals in the endfire beam having different arrival angles because of their different apparent propagation speeds. The Doppler shift is given by the equation $\Delta f_d = fV\cos\theta_i/c_0$, where f is the frequency of the waves in the incident signal, V is the artificial or simulated speed of the receiver as chosen by an operator, $\theta_i$ is the incident angle and $c_0$ is the propagation speed of the wave in a given medium, for example the speed of sound in water. If the Doppler shift is large enough compared to the FFT uncertainty, the angle will be measurable with greater accuracy than normally possible in an endfire beam.

By way of example, in one embodiment, the incident signal 30 has a wavelength of $\lambda/2$ and the linear array of receivers 16 contains N elements and has a length 24 equal to $100\lambda$. Each receiver is receiving signals up to 1 kHz for a total duration of 1 second, so that the frequency resolution is on the order of 1 Hz. The simulated receiver speed is chosen to be $V=100c_0$. This simulated speed is possible because the receiver is not actually physically moving. The receivers are sampled sequentially to generate the time series data. The Doppler shift analysis is performed on this generated time series. In one embodiment, the sampled data is first band pass filtered, for example by band pass filtering each receiver in the array. The simulated Doppler processing is then performed for each individual frequency band, and the results are averaged together to create a net simulated Doppler shift.

The desired artificial Doppler shift data are generated by artificially simulating the motion of receiver across the aperture length L in time T. When the receiver reaches the last receiver 28, sampling continues by returning to the first receiver 26 at the next time step, and the sequential sampling process is repeated. In the example given above, T=L/V=0.001 second, so each individual receiver samples data at a frequency of N/T, or 200 kHz, to accommodate the Doppler shifts. This is achieved after band pass filtering by interpolating the data sampled at 2 kHz to generate data points satisfying the 200 kHz sampling frequency. The virtual receiver transits across the aperture 1000 times in the 1 second duration.

In a preferred embodiment, the time T that the simulated receiver requires to transit across the aperture is chosen so that $cT=\lambda$. Therefore, the incoming wavefront should travel a distance of one wavelength in the time the receiver takes to transit across the array. This prevents discontinuities in the generated time series when the receiver returns to measure data from the beginning of the array at the next time step. Based on this, the artificial speed will ideally be $V=100c$ when $L=100\lambda$.

When the incident signal is incident to the linear array at substantially a zero angle with respect to the endfire direction, the Doppler shift for the given example is $\Delta f_d=100f$. In general, the artificial speed in this case will be V=Lf, and the transit time will be T=1/f. During the transit time T, the wave form will propagate a distance $cT=c/f=\lambda$, so that there will be no discontinuities in the generated time series. As the incident angle of the incident signal changes from endfire, i.e., zero degree angle, to an arbitrary incident angle $\theta_i$, a non-integer multiple of wavelengths of the incident signal are contained within the aperture, since the apparent propagation speed and wavelength increase. This can be eliminated by tuning the simulated speed. In one embodiment, the travel time across the aperture is adjusted so that there is an integer number of wavelengths of the incident signal within the aperture at that angle. For example, when there are between 99 and 100 wavelengths contained by the aperture, i.e., $99\lambda \leq L \leq 100\lambda$, the artificial transit time T is chosen such that exactly 99 wavelengths are sampled, so that $$T = \frac{L - 99\lambda_i}{c_i}.$$

In other words, the incident wavefront travels a distance equal to the fraction of a wavelength greater than 99 wavelengths in time T. At the incidence angle $\theta_i$, $c_i = c_0/\cos\theta_i$, $\lambda_i = c_i/f$, and $L = 100 c_0/f$, so that $$T = \frac{100}{f}(\cos\theta_i - 99/100). \quad (3)$$

When there are 100 wavelengths of the incident signal contained with the aperture array when $\theta_i = 0$, the above formula is good for $0 \leq \theta_i \leq \cos^{-1}(99/100)$, or up to 8 degrees. Since the incident angle $\theta_i$ is not known, a steering angle $\theta_s$ is varied to find the optimal value of T using the equation $$T = \frac{100}{f}(\cos\theta_s - 99/100). \quad (4)$$

If the incident angle $\theta_i$ differs from the steering angle $\theta_s$ by 2-3 degrees or more, Gibbs effects appear as artifacts in the power spectral density because of signal discontinuities between (time-adjacent) data points taken at x=L and then at x=0, i.e., from the last receiver to the first receiver. These artifacts are a sensitive indication of mismatches between the steering angle and the incident angle, since the signal is contained in a narrow band and the artifacts are distributed over the entire spectrum. The artifacts can be removed by aligning the steering and incident angles. Adjusting the steering angle $\theta_s$ until the artifacts disappear thus provides a way to accurately localize the signal incidence angle.

Figure 4:
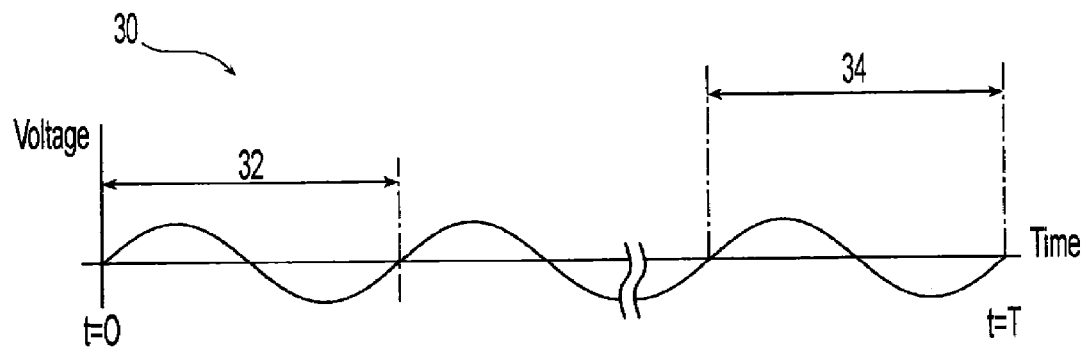
FIG. 4 is a graph illustrating an embodiment of a time series for the linear array of receivers.

Alternatively, the discontinuity from signals measured at x=0 and x=L can be directly averaged over the 100 receiver transits (in this example) to obtain a measure of the mismatch between $\theta_i$ and $\theta_s$. When the discontinuities disappear, the Doppler shift indicates the apparent propagation speed and thus the incident angle. In the example, each transit generates a time series having a duration of 0.001 seconds. If the receiver speed perfectly tuned, each of the 1000 time series contains exactly 99 periods, when the source does not coincide with the broadside direction. The 1000 time series are averaged, leading to a voltage vs. time plot 30 as show in FIG. 4. The voltage vs. time plot contains exactly 99 periods between a first period 32 starting at t=0 and final period 34 ending at t=T, i.e., 0.001 seconds. Therefore, the voltage at t=T is equal to the voltage at t=0, and sampling can proceed from the end of the array to the beginning of the array without any "jump" in the measured voltage.

Figure 5:
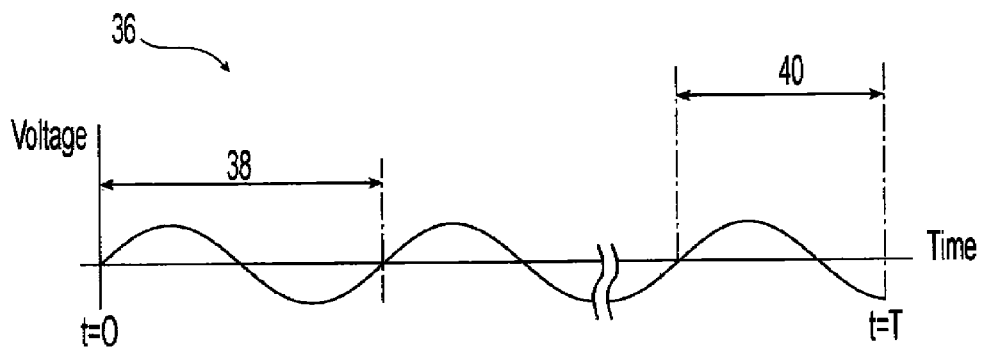
FIG. 5 is a graph illustrating another embodiment of a time series for the linear array of receivers.

The voltage at the first and final time samples are substantially the same when an integer number of wavelengths are contained within the aperture. If there is a mismatch between the tuned direction and the incident angle, a non-integer multiple of wavelengths will be contained within the aperture. Therefore, as illustrated in the voltage vs. time plot 36 averaged over 1000 transits and shown in FIG. 5, the first period 38 beginning at t=0 and the final period 40 ending at t=T, i.e., 0.001 seconds will not be substantially the same. In particular, the final period 40 will represent a fraction of a complete period, producing a voltage difference between time series at t=0 and t=T, i.e., a "jump". This voltage discontinuity or voltage jump is measured and used to obtain a measure of the mismatch between $\theta_i$ and $\theta_s$. The steering angle and hence the transit time across the aperture is adjusted until the voltage discontinuity disappears, yielding the incident angle. The difference between the voltage values at t=0 and t=T may in some cases be easier to detect than Gibbs effects artifacts, which when small, may be difficult to distinguish from noise.

If there are two or more closely spaced signals with approximately equal amplitude, this will be indicated by Gibbs effect artifacts that do not disappear regardless of steering angle, because the steering direction can be matched to at most one of them. Therefore, adjusting the steering angle and detecting Gibbs effects that do not disappear indicates two or more concurrent incident signals that are closely spaced together, i.e., that have incident angles that differ by a few degrees of less.

The above example did not include any noise. Before applying this process, noise from other beams can be eliminated with a wavenumber filter that eliminates waves arriving in directions other than endfire. A wavenumber filter is a "band pass" spatial filter, analogous to a band pass filter in the frequency domain. Instead of filtering out energy outside of a given frequency domain, it filters out energy outside of a given beam. This is a form of beamforming, described, for example, in "Principles of Underwater Sound" by R. J. Urick (McGraw-Hill, 1975, p. 51).

In the example given (a 100$\lambda$ line array), the endfire beam is about 12 degrees wide between its 3-dB points. Artificial Doppler processing allows the localization of a target in the endfire beam to an accuracy of approximately 2-3 degrees, a substantial improvement in resolution.

In accordance with one exemplary embodiment of the method for using the simulated Doppler effect to measure the incident angle of the incident signal, the simulated speed is tuned or adjusted in accordance with the wavelength of the incident signal. This wavelength can be known based upon the known type of signal or can determined empirically. Tuning the simulated speed includes setting an initial simulated speed based on the incident angle being zero degrees. The initially simulated speed is chosen so that there are an integer multiple of wavelengths for the incident signal within the aperture as result of an endfire incident signal. Tuning of the simulated speed also includes tuning the simulated speed to maintain an integer multiple of wavelengths of the incident signal in the aperture, for example upon recognition of an incident signal for incident signals that deviate from the direct endfire line by an angle of incidence.

In order to tune or adjust the simulated speed for incident signals having an unknown incident angle that is greater than zero, the artifacts in the spectral densities of the data from adjacent data points are utilized. In one embodiment, the power spectral densities in the simulated times series data are monitored for artifacts that indicate discontinuities in time adjacent data points. As was discussed above, these artifacts correspond to the Gibbs effects. The simulated speed is adjusted until these artifacts disappear.

Although methods in accordance with the present invention were discussed with regard to a specific application, methods in accordance with the present invention are not limited to these illustrative examples. For example, an analogous method can be used for processing of radar signals using a line array to determine the incident angle of a radar signal. In addition, method in accordance with the present invention can also be used in beams that deviate from the endfire beam by more than a few degrees. However, the simulated speed needs to be increased as the broadside beam is approached. In addition, two or more signals in the endfire beam can potentially be separately resolved with an optimization technique such as a least squares algorithm, by leaving each source strength and location as unknowns, and then determining the value of the unknowns that best fits data taken over a plurality of steering angles. A least squares approach assumes a function that approximates the data, but having undetermined parameters (e.g. location and source strength). The parameters are found by minimizing the sum of the square of the difference between the actual data and the function at every measurement point. In one embodiment, angular locations can be independently determined for all the individual frequency bands created by the band pass filters and then averaged to reduce error. If two closely spaced sources cover different frequency bands, the location of at least one can be determined with the bands where it is dominant.

The following examples illustrate the discontinuities in the spectral power density resulting from changes in the incident angle. If the time T is chosen so that there are no discontinuities, the signal will take the form $$f(t) = \sin \Omega t; 0 \leq t \leq MT;$$

$$f(t) = 0; t < 0 \text{ or } t > MT. \quad (5)$$

Here M is the number of transits across the array, and $\Omega = 2\pi f_d$. The Fourier transform is:

$$F(\omega) = \int_0^{MT} e^{i\omega t} \sin\Omega t \, dt \quad (6)$$

$$= \frac{i\Omega \sin(2\pi M\omega/\Omega)}{\omega^2 - \Omega^2} - \frac{2\Omega \sin^2(\pi M\omega/\Omega)}{\omega^2 - \Omega^2}.$$

The power spectral density is shown in FIG. 2, indicating the expected 1-Hz uncertainty in frequency centered at 100 kHz. The units in FIGS. 2 and 3 are power (voltage$^2$/Hz) vs. frequency (Hz) for original measurements that are expressed in volts.

When there is a discontinuity between data obtained at x=0 and x=L, a Fourier series must first be obtained for the N data points obtained on each transit. Here, the signal is f(t)=sin($\Omega$t cos $\theta_i$), which can be written in the form $$f(t) = \frac{a_0}{2} + \sum_{n=1}^{\infty} [a_n \cos(2n\pi t/T) + b_n \sin(2n\pi t/T)], \quad (7)$$

where $$a_n = \frac{2}{T} \int_0^T f(t) \cos(2n\pi t/T) \, dt \quad (8)$$

$$= -\frac{8n\pi \sin^2(\Omega T \cos\theta_i)}{\Omega^2 T^2 \cos^2\theta_i - 4n^2\pi^2};$$

$$b_n = \frac{2}{T} \int_0^T f(t) \sin(2n\pi t/T) \, dt$$

$$= \frac{4n\pi \sin(\Omega T \cos\theta_i)}{\Omega^2 T^2 \cos^2\theta_i - 4n^2\pi^2}.$$

The Fourier transform is then $$F(\omega) = \frac{a_0}{2}\delta(t) + \int_0^{MT} e^{i\omega t} \sum_{n=1}^{\infty} [a_n \cos(2n\pi t/T) + b_n \sin(2n\pi t/T)] \, dt \quad (9)$$

or, assuming a zero-mean signal (i.e., $a_0$=0), $$F(\omega) = \sum_{n=1}^{\infty} a_n \left[ \frac{\omega \sin\omega}{\omega^2 - 4n^2\pi^2/T^2} - \frac{2i\omega \sin^2(\omega/2)}{\omega^2 - 4n^2\pi^2/T^2} \right] - \sum_{n=1}^{\infty} b_n \left[ \frac{(4n\pi/T)\sin^2(\omega/2)}{\omega^2 - 4n^2\pi^2/T^2} - \frac{(2in\pi/T)\sin\omega}{\omega^2 - 4n^2\pi^2/T^2} \right]. \quad (10)$$

FIG. 3 shows the case when $\theta_i$ is 3 degrees. There are considerable artifacts in the power spectral density (bottom plot of FIG. 3), and the dominant energy is shared by adjacent main lobes. When $\theta_i$ is 3 degrees, only 100 cos $\theta_i$ wavelengths fit into the aperture, or 99.86 wavelengths. This leads to a significant discontinuities between signals at x=0 and x=L, since there is a mismatch of approximately $\lambda/8$. This shows that a misalignment of only 3 degrees between the incident and steering angles can be detected.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for determining signal direction, the method comprising:

sampling each one of a plurality of receivers arranged in a linear array in sequence to simulate a single receiver moving along an aperture defined by the linear array at a simulated speed and to generate simulated time series data;

tuning the simulated speed in accordance with the wavelength of a signal incident upon the linear array by setting an initial simulated speed based on a zero degree incident angle corresponding to an endfire direction and an integer multiple of wavelengths of the incident signal disposed within the aperture;

measuring a Doppler shift in the incident signal using the simulated time series data; and determining an incident angle between the incident signal and the linear array of receivers using the measured Doppler shift.

2. The method of claim 1, wherein the step of tuning the simulated speed further comprises tuning the simulated speed to maintain an integer multiple of wavelengths of the incident signal within the aperture.

3. The method of claim 2, wherein the step of tuning the simulated speed further comprises:

monitoring power spectral densities in the simulated time series data for artifacts indicating discontinuities in time adjacent data points; and adjusting the simulated speed until the artifacts disappear.

4. The method of claim 3, wherein the artifacts correspond to Gibbs effects.

5. The method of claim 1, wherein:
the method further comprises band pass filtering the simulated time series data; and
the step of measuring the Doppler shift further comprises measuring the Doppler shift on each individual frequency band.

6. The method of claim 5, wherein the step of band pass filtering further comprises band pass filtering each receiver in the linear array of receivers.

7. The method of claim 5, wherein:
the step of determining the incident angle further comprises determining an incident angle for each individual frequency band; and
the method further comprises averaging all of the incident angles to determine a net incident angle.

8. The method of claim 1, wherein the receivers comprise audio receivers, hydrophones, radar receivers, microwave receivers or combinations thereof.

9. The method of claim 1, further comprising:
generating a plurality of simulated time series data;
averaging the simulated time series data;
detecting a discontinuity between a voltage measured at a first time sample in the averaged time series data and a voltage measured at a final time sample in the averaged time series data; and
wherein the step of tuning the simulated speed further comprises tuning the simulated speed until the discontinuity disappears.

10. The method of claim 2, wherein the step of tuning the simulated speed further comprises:
monitoring power spectral densities in the simulated time series data for artifacts indicating discontinuities in adjacent time samples; and
identifying the existence of two or more incidents spaced signals having closely spaced incident angles through the failure of tuning the simulated speed to eliminate the artifacts in the power spectral densities.

11. The method of claim 1, further comprising applying a wave number filter to the simulated time series data to reduce signal noise.

12. The method of claim 1, wherein the step of tuning the simulated speed further comprises increasing the simulated speed with an increase in the incident angle.

13. The method of claim 1, further comprising:
using an optimization technique on the simulated time series data to separately resolve two incident signals.

14. The method of claim 13, wherein the optimization technique comprises a least squares algorithm.

15. The method of claim 14, wherein the step of using the optimization technique further comprises:
obtaining simulated time series data over a plurality of steering angles;
setting source strength and source location of the incident signals as unknown values; and
determining the values of source strength and source location that best fits the simulated time series data obtain over the plurality of steering angles.

* * * * *